(12) United States Patent
Chou et al.

(10) Patent No.: US 8,102,557 B2
(45) Date of Patent: Jan. 24, 2012

(54) SYSTEM AND METHOD FOR DISABLING ACCESS TO NON-VOLATILE STORAGE IN A MULTI-FUNCTION PERIPHERAL

(75) Inventors: Dee Chou, Santa Ana, CA (US); Walter Filbrich, Manhattan Beach, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 995 days.

(21) Appl. No.: 11/599,217

(22) Filed: Nov. 13, 2006

(65) Prior Publication Data

US 2008/0114922 A1  May 15, 2008

(51) Int. Cl.
*G06K 15/00* (2006.01)

(52) U.S. Cl. ....... 358/1.16; 711/111; 711/150; 711/171; 711/173

(58) Field of Classification Search ............ 358/1.16
See application file for complete search history.

(56) References Cited

U.S. PATENT DOCUMENTS

| | | | | |
|---|---|---|---|---|
| 7,200,770 | B2 * | 4/2007 | Hartwell et al. | 714/6.32 |
| 2002/0048978 | A1 * | 4/2002 | Hahn et al. | 439/157 |
| 2002/0073340 | A1 * | 6/2002 | Mambakkam et al. | 713/202 |
| 2006/0044611 | A1 * | 3/2006 | Aoki et al. | 358/1.15 |
| 2006/0158690 | A1 * | 7/2006 | Willman | 358/1.16 |
| 2009/0048978 | A1 * | 2/2009 | Ginter et al. | 705/51 |

OTHER PUBLICATIONS

Data Overwrite Security Software A, http://ww.riocoh.co.uk/products/showrecord.cfm, Oct. 2, 2006.
Options Security Options http://ww.riocoh.co.uk/products/listrecord.cfm, Oct. 2, 2006.
SecureJet Print-SMP Embedded Secure Printing client for hp MFPs and Printers http://www.jetmobile.com/p;rocucts/SecureJet/SecureJet_Print, Aug. 27, 2006.

* cited by examiner

*Primary Examiner* — Benny Tieu
*Assistant Examiner* — Marcellus Augustin

(57) ABSTRACT

A multi-function peripheral (MFP) device having enhanced security for processed data is disclosed. The MFP includes both a non-volatile memory and a volatile memory. The MFP also includes a user interface configured to allow a user to prevent data from being stored on the non-volatile memory. The MFP further includes a processor or a switch configured to disable access to the non-volatile memory. The MFP blocks data from being stored on its non-volatile memory upon a user's selection via the user interface. The data is only temporarily stored on the volatile memory, and is erased after processing. This configuration prevents others from having access to the data.

23 Claims, 6 Drawing Sheets

SYSTEM AND METHOD FOR DISABLING ACCESS TO NON-VOLATILE STORAGE IN A MULTI-FUNCTION PERIPHERAL

BACKGROUND OF THE INVENTION

1. Field of the Invention

The present invention relates to multi-function peripheral devices, and more particularly to the security of multi-function peripheral devices.

2. Description of the Related Technology

Recently, multi-function peripheral devices (MFPs) have been widely used for their convenience and versatility. Typically, MFPs include two or more of the following functions: copying, scanning, printing, faxing, and emailing.

MFPs are often used by multiple users to maximize the use thereof. In many cases, MFPs are located in an open space for common use by multiple users. Under these circumstances, the security of materials processed by MFPs has been a concern, particularly when the materials include confidential information.

Various attempts have been made to enhance the security of MFPs. A certain MFP permits access only to registered users, using various authentication tools (e.g., identification (ID) number and password). Another MFP is provided with a secured printing function. With such an MFP, a user may remotely send a print job from a computer to the MFP, but is required to input a password at a user interface of the MFP to complete the print job. This function secures printouts or information thereon from others while the user is not present at the MFP.

SUMMARY OF CERTAIN INVENTIVE ASPECTS

One aspect of the invention provides a multi-function peripheral (MFP) device, comprising: a non-volatile memory; a volatile memory configured to temporarily store data; and a user interface configured to allow a user to prevent the data from being stored on the non-volatile memory.

The non-volatile memory may comprise a hard disk or a flash memory. The volatile memory may comprise a random-access memory. The device may further comprise a processor configured to disable access to the non-volatile memory. The device may further comprise a switch configured to disable access to the non-volatile memory. The switch may comprise a logical switch or a mechanical switch.

The user interface may comprise an input device configured to allow a user to disable access to the non-volatile memory. The input device may be integral with the MFP, and the input device may comprise a physical button or a touch-screen. The input device may be remotely connected to the MFP, and the input device may comprise a computer or a remote control.

The user interface may further comprise a display device indicating whether the access to the non-volatile memory is disabled. The display device may comprise a light-emitting diode, a display screen, and/or a computer monitor. The user interface may be further configured to request security information when allowing a user to prevent data from being stored on the non-volatile memory. The MFP may be configured to allow data to be retrieved from the non-volatile memory while preventing data from being stored on the non-volatile memory.

Another aspect of the invention provides a method of operating a multi-function peripheral device (MFP) having a non-volatile memory and a volatile memory. The method comprises: disabling writing access to the non-volatile memory; storing data on the volatile memory; and performing an MFP function using the data stored on the volatile memory.

The MFP function may comprise at least one of faxing, copying, scanning, printing, and emailing. The non-volatile memory may comprise a hard disk or a flash memory, and the volatile memory may comprise a random-access memory.

The method may further comprise allowing a user to opt for disabling the writing access to the non-volatile memory. The method may further comprise receiving security information when allowing the user to opt for disabling the writing access to the non-volatile memory. The method may further comprise displaying whether the writing access to the non-volatile memory is disabled. The method may further comprise allowing retrieving data from the non-volatile memory while disabling the writing access to the non-volatile memory.

Disabling the writing access to the non-volatile memory may comprise preventing a first type of data from being written on the non-volatile memory while allowing a second type of data to be written on the non-volatile memory. The first type of data may comprise data to be processed for at least one of faxing, copying, scanning, printing, and emailing, and the second type of data may comprise at least one of accounting information and user information.

DETAILED DESCRIPTION OF CERTAIN INVENTIVE EMBODIMENTS

Figure 1:
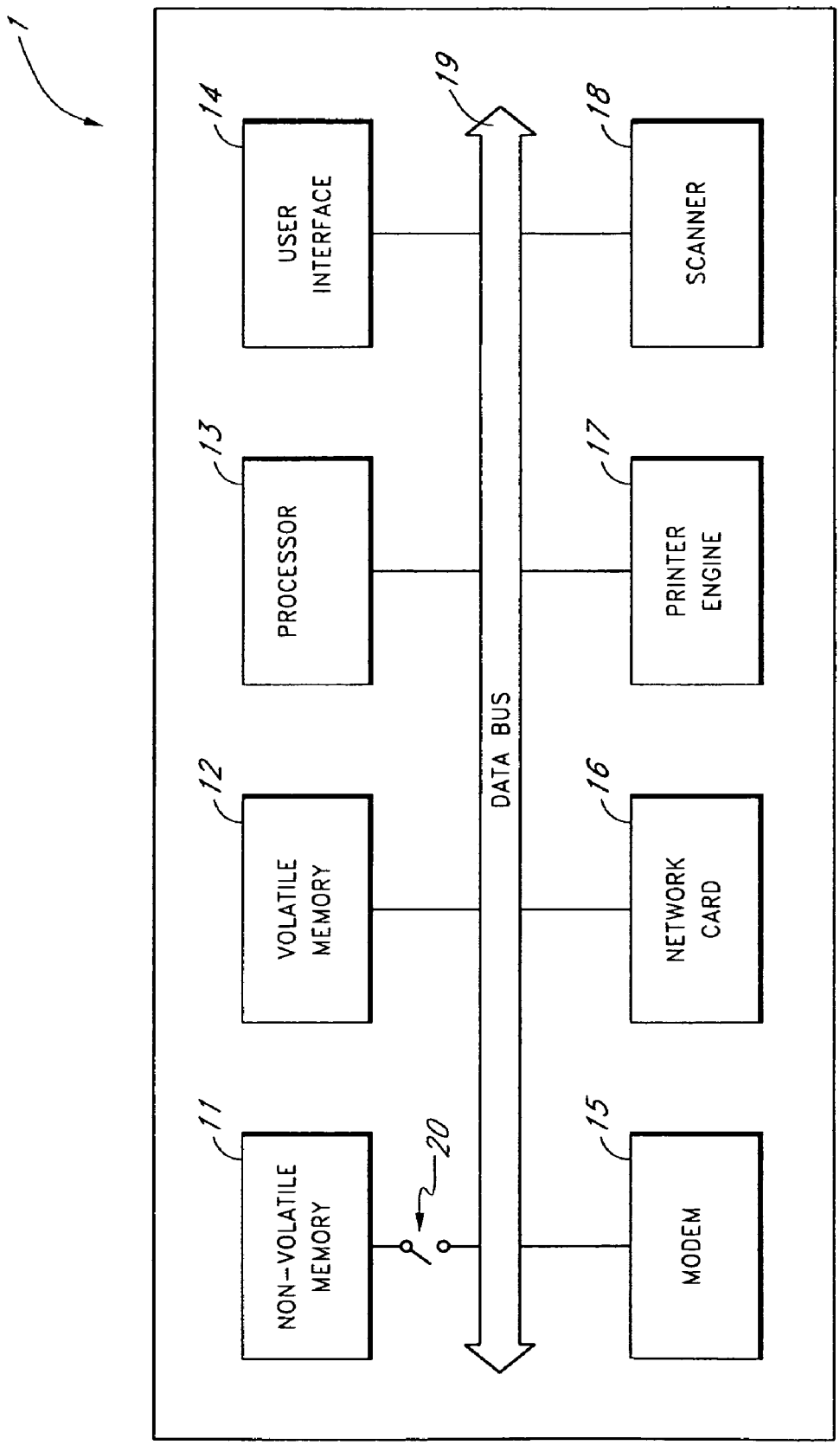
FIG. 1 is a block diagram of one embodiment of a multi-function peripheral device (MFP).

Various aspects and features of the invention will become more fully apparent from the following description and appended claims taken in conjunction with the foregoing drawings. In the drawings, like reference numerals indicate identical or functionally similar elements.

Multi-function peripheral devices (MFPs) include a memory or storage device to store data to be processed by the MFPs. Most MFPs include a volatile memory (e.g., a random-access memory (RAM)) which temporarily stores data for processing. After data on the volatile memory has been processed, new data for a next job may overwrite the previous data. In addition, the volatile memory loses data when the MFP is turned off.

In addition to the volatile memory, certain MFPs also include a non-volatile memory (e.g., a hard disk or flash memory) to enhance data storage capacity. In such MFPs, because a volatile memory typically has a limited storage capacity, the volatile memory only stores data which will be immediately processed, to the extent that its capacity allows. On the other hand, the non-volatile memory has an extended storage capacity, and thus serves as a back-up for the volatile memory. In addition, the non-volatile memory may retain data permanently for a repeated or future use even after the MFP is powered off.

In certain instances, a user may process confidential material (e.g., a document, an image, or an electronic file containing the foregoing) with an MFP having both volatile and non-volatile memories as described above. The MFP may process the material using the non-volatile memory if the volatile memory does not have a sufficient capacity to store the entire material. In such a case, a portion or all of the material may remain on the non-volatile memory. Others may intentionally or unintentionally have access to the materials remaining on the non-volatile memory. This may cause a serious security problem.

To prevent such a security problem, certain MFPs are provided with a data overwrite security software program. The data overwrite security software program is configured to overwrite data on the non-volatile memory with one or more sets of random data immediately after the data has been processed. Thus, the data overwrite security software program prevents others from obtaining the originally processed data.

The data overwrite security software program, however, has a negative impact on the performance of the MFP. Until the overwriting process is completed, a subsequent job cannot be processed if the subsequent job requires use of the non-volatile memory.

MFP with Secured Job Function

In one embodiment, similar to the MFPs described above, a multi-function peripheral device includes both a volatile memory (e.g., a random-access memory (RAM)) and a non-volatile memory (e.g., a hard disk or flash memory). The MFP is configured to prevent data from being stored on the non-volatile memory upon a user's selection via a user interface. In the context of this document, this function of preventing data from being stored on a non-volatile memory may be referred to as a "secured job function." The secured job function prevents others from having access to processed data because the data is only temporarily stored on the volatile memory. In addition, the secured job function does not affect the performance of the MFP because the non-volatile memory is immediately available for a next job unlike those of MFPs having a data overwrite security software program.

FIG. 1 illustrates a multi-function peripheral device (MFP) 1 according to one embodiment. The MFP 1 is an all-in-one office machine having various functions. The illustrated MFP 1 has functions such as printing, scanning, facsimile receiving and transmitting, photocopying, and emailing. A skilled technologist will appreciate that the MFP 1 may have more or less functions, depending on the design of the MFP 1.

The illustrated MFP 1 includes a non-volatile memory 11, a volatile memory 12, a processor 13, a user interface 14, a modem 15, a network card 16, a printer engine 17, a scanner 18, and a data bus 19 interconnecting the foregoing components with one another. The illustrated MFP 1 also includes a switch 20 between the non-volatile memory 11 and the data bus 19. In another embodiment, the MFP 1 may have no switch between the non-volatile memory 11 and the data bus 19. In such an embodiment, the processor 13 may serve to connect or disconnect the non-volatile memory 11 from the data bus 19. It will be appreciated that some of the components may be omitted from the MFP 1. It will also be appreciated that additional components may be added to the MFP 1 depending on the design of the MFP 1.

The non-volatile memory 11 is configured to store data and retain the stored data even after the MFP 1 is powered off. Examples of the non-volatile memory 11 include, but are not limited to, a hard disk and a flash memory. In certain embodiments, the non-volatile memory may have a storage capacity of about 2 gigabytes to about 200 gigabytes. It will be appreciated that the capacity may vary widely depending on the MFP design. It will also be appreciated that various types of non-volatile memories can be adapted for use in the MFP 1.

The non-volatile memory 11 is configured to store data temporarily or permanently. In one embodiment, the non-volatile memory 11 may temporarily store data for various jobs of the MFP, e.g., printing, copying, faxing, emailing, and scanning. For example, the data may include image data and document data. After a job has been completed, the non-volatile memory 11 may be configured to delete the data by overwriting the data with blank or random data (for a hard disk) or resetting the memory (for a flash memory). In another embodiment, the non-volatile memory 11 may permanently store certain forms, fonts, information, and/or software programs to be recalled from the MFP 1 or other external devices.

The non-volatile memory 11 may be used for certain jobs of the MFP 1 which require a large memory space. In one embodiment, the non-volatile memory 11 is used for collated jobs for printing or copying. The term "collated job" generally refers to generating a plurality of sets of printouts or copies with each set arranged in a page sequence. Collated jobs require that all pages of the job be stored on the non-volatile memory 11 so that the pages can be reprinted for each set.

In another embodiment, the non-volatile memory 11 may be used for spooling. The term "spooling" generally refers to storing data in a buffer so that a device can retrieve it when it is ready. The non-volatile memory 11 may serve as a buffer for spooling. For example, while the MFP 1 is in use for a job, a new job may be received and stored on the non-volatile memory 11. When the previous job has been completed, the new job is retrieved for processing.

In yet another embodiment, the non-volatile memory 11 may be used for stored jobs. The term "stored job," as used herein, refers to allowing a user to store data on the MFP 1 and use it at a later time. For example, a user may send a document file from a computer to the MFP 1, and may store it on the non-volatile memory 11 of the MFP 1. The user may request at the MFP 1 at a later time that the document be printed. In some embodiments, a stored job may be provided with a security feature. For example, when a user requests printing at a later time, the MFP 1 may request security information such as a password.

In certain embodiments, the non-volatile memory 11 may store various fonts and forms. For example, various fonts may be stored on the non-volatile memory 11 and recalled from a printer driver or other applications. Frequently used forms (e.g., facsimile transmittal forms) may also be stored on the non-volatile memory 11 and recalled whenever needed.

The volatile memory 12 is configured to temporarily store data. The volatile memory 12 loses data when the MFP 1 is switched off. An exemplary volatile memory is a random-access memory (RAM). It will be appreciated that other types of volatile memories may also be adapted for use in the MFP 1. The volatile memory 12 may have a storage capacity of 128 megabytes to 1024 megabytes. It will be appreciated that the capacity of the volatile memory 12 may vary widely depending on the MFP design.

The volatile memory 12 stores data used for operation and various jobs of the MFP 1, e.g., faxing, emailing, scanning, printing, and photocopying. The volatile memory 12 provides fast but temporary storage for the operation and functions of the MFP 1. For example, document or image data may be temporarily stored on the volatile memory 12 for a print job. Once the print job has been completed, the data may be lost by overwriting the data with new data for another job for the MFP 1. The data may also be erased when the MFP 1 is powered off.

In certain embodiments, when a high volume of data for an MFP job exceeds the capacity of the volatile memory 12, the non-volatile memory 11 may be used to back up the volatile memory 12. In such embodiments, a first portion of the data is first stored on the volatile memory 12 to the extent that the storage capacity of the volatile memory 12 allows. Then, the first portion of the data is processed for the job. While the first portion of the data is processed, a second portion of the data is transmitted to the non-volatile memory 11 via the volatile memory 12. During this step, the second portion of the data is temporarily stored on any available memory space in the volatile memory 12, and is immediately transmitted to the non-volatile memory 11. The second portion is then stored on the non-volatile memory 11. After the first portion of the data has been processed, the second portion of the data is retrieved to the volatile memory 12 for processing. These steps are repeated until the entire data is processed. In some cases, all portions of data are stored on the non-volatile memory 11, and are retrieved to the volatile memory 12 on a first-in-first-out (FIFO) basis. A skilled technologist will appreciate that various methods of using the non-volatile and volatile memories are possible for various jobs of the MFP 1.

The processor 13 is configured to control the operation of the MFP 1 for various functions thereof. In addition, the MFP 1 may control the switch 20 to electrically connect or disconnect the non-volatile memory 11 from the data bus 19. In another embodiment where an MFP has no switch, the processor may be configured to block data from being stored on the non-volatile memory. The processor 13 may comprise a CPU typically used for an MFP. Details of one embodiment of the switching operation of the processor 13 will be described below with reference to FIG. 6.

The user interface 14 is configured to interface a user with the MFP 1. The user interface 14 includes an input device and a display device. The input device may include a keypad, a keyboard, and/or functional buttons. The display device may include a CRT or LCD screen. In certain embodiments, the input device and the display device may be combined with each other. An exemplary combined device is a touchscreen.

The illustrated user interface 14 is integral with the MFP 10. In another embodiment, the user interface 14 may be connected to the MFP 1 via a USB port of the MFP 1. In yet another embodiment, the user interface 14 may be connected to the MFP 1 via a wireless connection. The wireless connection may be provided using any suitable wireless technology. Exemplary wireless technologies include, but are not limited to, radio frequency, infrared waves, wireless personal area network (PAN) (e.g., Bluetooth™), and wireless LAN (e.g., Wi-Fi). In certain embodiments, the user interface 14 may also include a computer connected to the MFP 1. Various examples of user interfaces will be described later in detail.

The modem 15 is configured to establish a network connection with other devices over a telephone network. The modem 15 may be used for the facsimile function of the MFP 1. The modem 15 may be one which is typically used in an MFP or a facsimile device. The modem 15 is configured to modulate an analog carrier signal to encode digital information, and is also configured to demodulate such a carrier signal to decode transmitted information.

The network card 16 is configured to establish a network connection with other devices over a computer network. Examples of the computer network include, but are not limited to, local area network (LAN), wide area network (WAN), and the Internet. The computer network may be a wired or wireless network. Exemplary wired network technologies include, but are not limited to, Ethernet, ISDN, and DSL. Exemplary wireless technologies include, but are not limited to, radio frequency, infrared waves, wireless personal area network (PAN) (e.g., Bluetooth™), wireless LAN (e.g., Wi-Fi), CDMA, and satellite technologies. A skilled technologist will appreciate that various types of networks can be used for the MFP 1.

The network card 16 may be one which is typically used in an MFP. The network card 16 may also be referred to as a "network adaptor," "network interface card," or "NIC." The network card 16 may be used for various functions of the MFP 1, for example, transmitting data to a computer or receiving data from a computer over a computer network for the printing, scanning, faxing, or emailing function of the MFP 1. The network card 16 may be embedded in the MFP 1. In another embodiment, the network card 16 may be externally plugged into a USB port of the MFP 1.

The printer engine 17 is configured to convert electronic data into physical documents. The scanner 18 is configured to scan physical documents and convert them into electronic data. The printer engine 17 and the scanner 18 may be ones typically used for an MFP or a facsimile device. The printer engine 17 and the scanner 18, either alone or in combination, perform various functions of the MFP 10, for example, scanning, photocopying, printing, and faxing.

The data bus 19 is configured to interconnect the components described above or other components, if any, in the MFP 1. The data bus 19 can include multiple sub-buses. Examples of the data bus and interface technology include, but are not limited to, Peripheral Component Interconnect (PCI), Integrated Drive Electronics/Parallel AT Attachment/Serial AT Attachment (IDE/PATA/SATA), Universal Serial Bus (USB), and internal chip buses. It will be appreciated that the MFP 1 may include any other suitable data bus technology.

The switch 20 is configured to connect or disconnect the non-volatile memory 11 from the data bus 19. In one embodiment, the switch 20 may be a mechanical switch which physically switches an electrical connection between the non-volatile memory 11 and the data bus 19. In another embodiment, the switch 20 may be a logical switch, for instance, a switch consisting of a logic circuit to establish an electrical connection. In yet another embodiment, the switch may be omitted and the processor may provide a switching function purely using a software program. A skilled technologist will appreciate that various configurations of switches can be adapted for use in the MFP 1.

In the above embodiments, the switch 20 is configured to respond to a signal from the user interface 14. In one embodiment, the signal may be transmitted to the switch 20 via the processor 13. The processor 13 may delay sending the signal to the switch 20 when the non-volatile memory 11 is in use for another job. In an embodiment where the MFP 1 includes a mechanical switch, the mechanical switch may be mechanically connected to the user interface 14, for example, the button 204 of FIG. 2. In such an embodiment, the button may immediately turn the switch 20 on or off, regardless of whether the non-volatile memory 11 is in use for another job.

Figure 2:
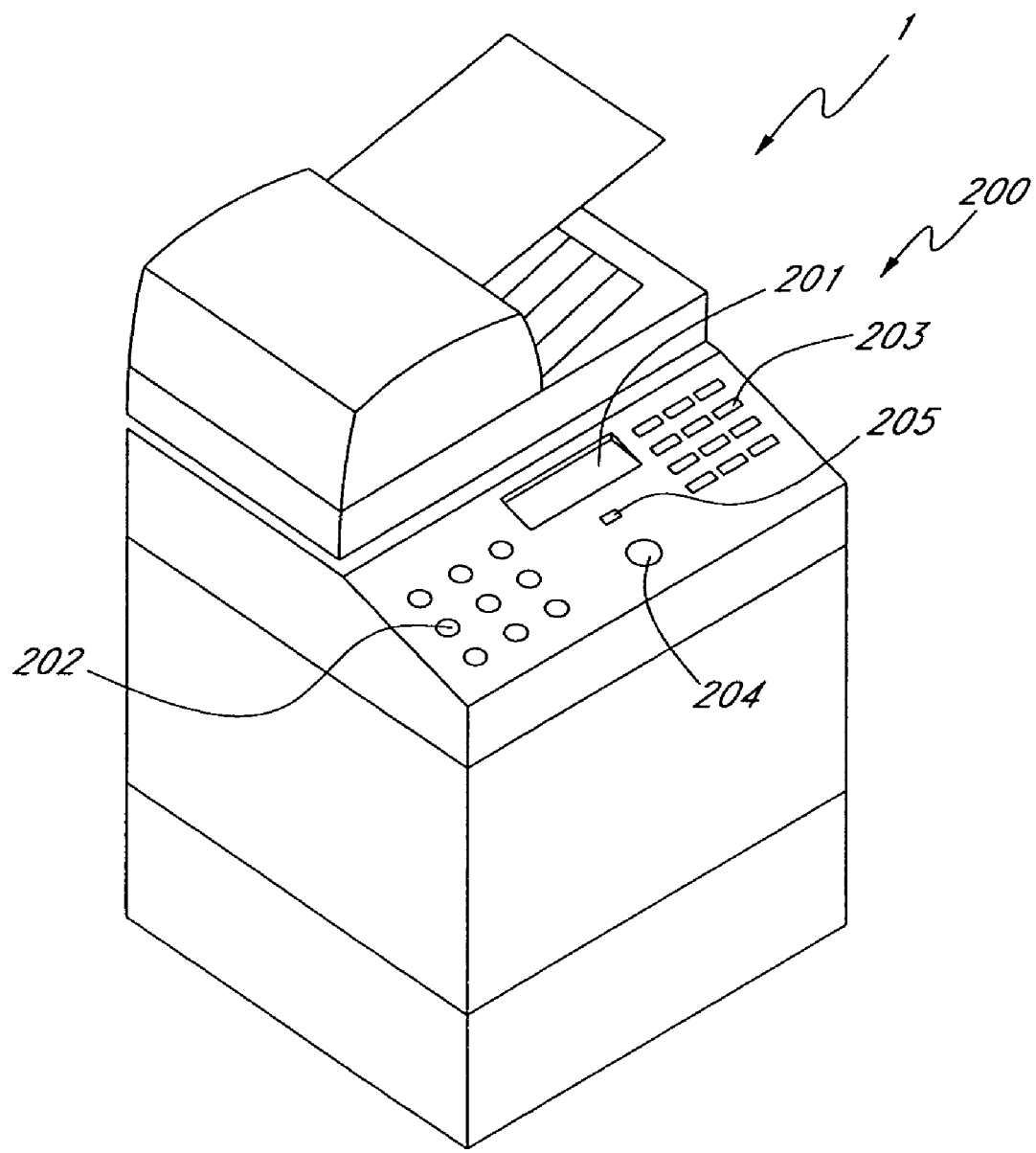
FIG. 2 is a perspective view of the MFP of FIG. 1 including a user interface according to one embodiment.

Referring to FIGS. 2-5, examples of the user interface 14 will be described below. FIG. 2 is a perspective view of the MFP 1 of FIG. 1 according to one embodiment. The MFP 1 includes a user interface 200. The illustrated user interface 200 includes an LCD screen 201, functional buttons 202, and a keypad 203. The user interface 200 also includes a button 204 for allowing a user to select the secured job function described above, i.e., preventing data from being stored on the non-volatile memory 11. The button 204 may be a toggle button which provides two states: on and off. If the toggle button is pressed, it is on, and if not, it is off. In other embodiments, the button 204 may be a non-toggle button. Such a non-toggle button changes the state each time it is pressed.

The illustrated user interface 200 also includes a light-emitting diode (LED) indicator 205 indicating whether the secured job function is on or off. In one embodiment, the LED indicator 205 is configured to directly respond to the status of the switch 20. For example, in an embodiment where a mechanical switch forms the switch 20, the LED indicator 205 is configured to be turned on when the mechanical switch is turned off or vice versa. In another embodiment, the LED indicator 205 may be controlled by a logic circuit configured to respond to the status of the switch 20. In yet another embodiment, the LED indicator 205 can be driven by a software program running on the processor 13.

In certain embodiments, the user interface 200 can include two LED indicators. One of the LED indicators may indicate that a secured job has been enabled or requested. The other LED indicator may provide confirmation that the non-volatile memory 11 is physically disconnected or that writing access to the non-volatile memory 11 is denied. A certain single LED indicator may provide the functions of the two LED indicators by changing its color. In certain embodiments, an LED indicator may be positioned on the button 204. It will be appreciated that various configurations of LEDs may be adapted for use with the MFP 1.

Figure 3:
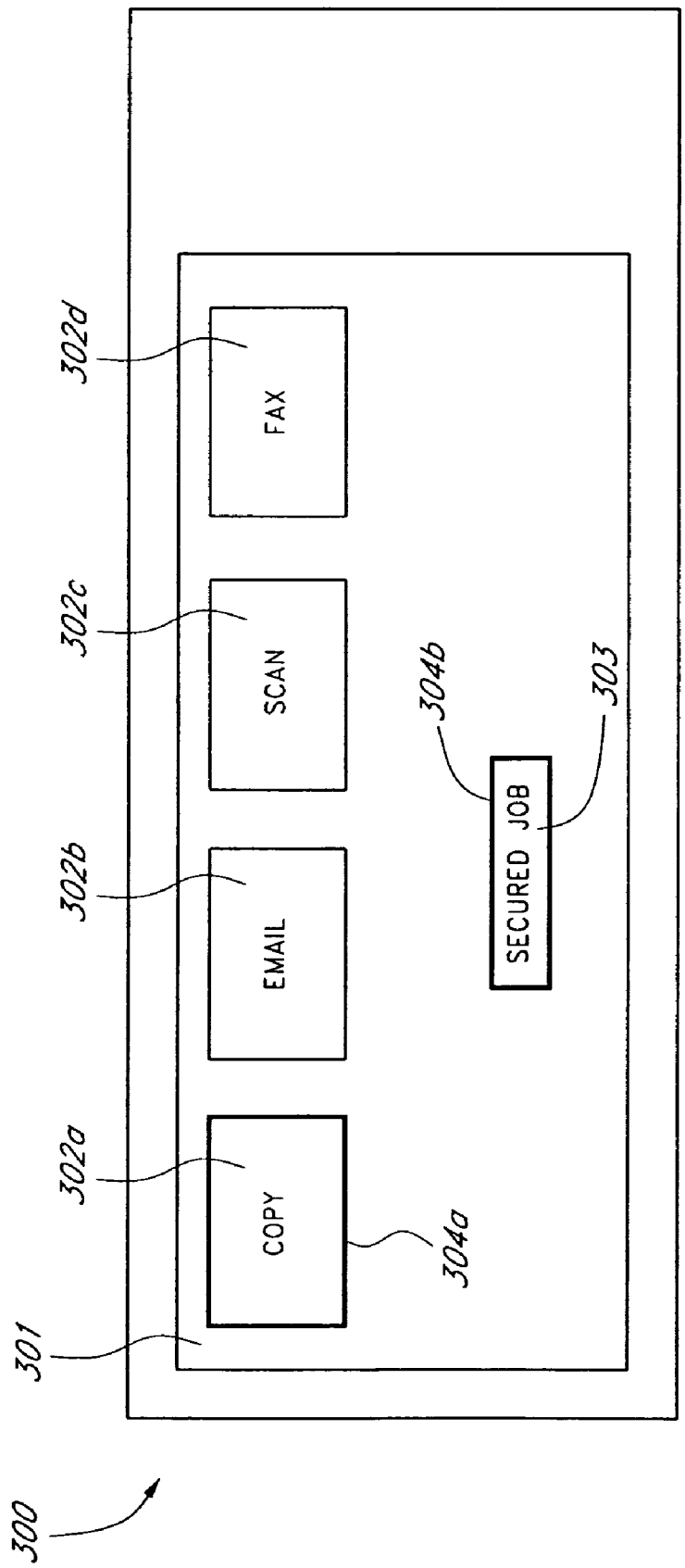
FIG. 3 illustrates another embodiment of a user interface of the MFP of FIG. 1.

FIG. 3 illustrates a user interface 300 of the MFP 1 of FIG. 1 according to another embodiment. The illustrated user interface 300 includes a touchscreen 301. The illustrated touchscreen 301 displays various buttons 302a-302d. The buttons include a "COPY" button 302a, an "EMAIL" button 302b, a "SCAN" button 302c, and a "FAX" button 302d. It will be appreciated that the touchscreen 301 may have various other buttons for other functions or operation of the MFP 1. The touchscreen 301 also includes a highlight 304a which indicates a function selected by a user. In the illustrated embodiment, the "COPY" button 302a has been selected as the highlight 304a indicates.

The touchscreen 301 also includes a button 303, "SECURED JOB," for allowing a user to select the secured job function described above. When the button 303 has been touched, another highlight 304b is positioned on the button 303, indicating that the secured job function is on.

In another embodiment, the MFP 1 has a computer as a user interface. The computer may be directly connected to the MFP 1 via a USB or parallel port of the MFP 1. In other embodiments, a computer may be connected to the MFP 1 over a wired or wireless network. It will be appreciated that various configurations of networks can be adapted for establishing a network connection between a computer and the MFP 1.

Figure 4:
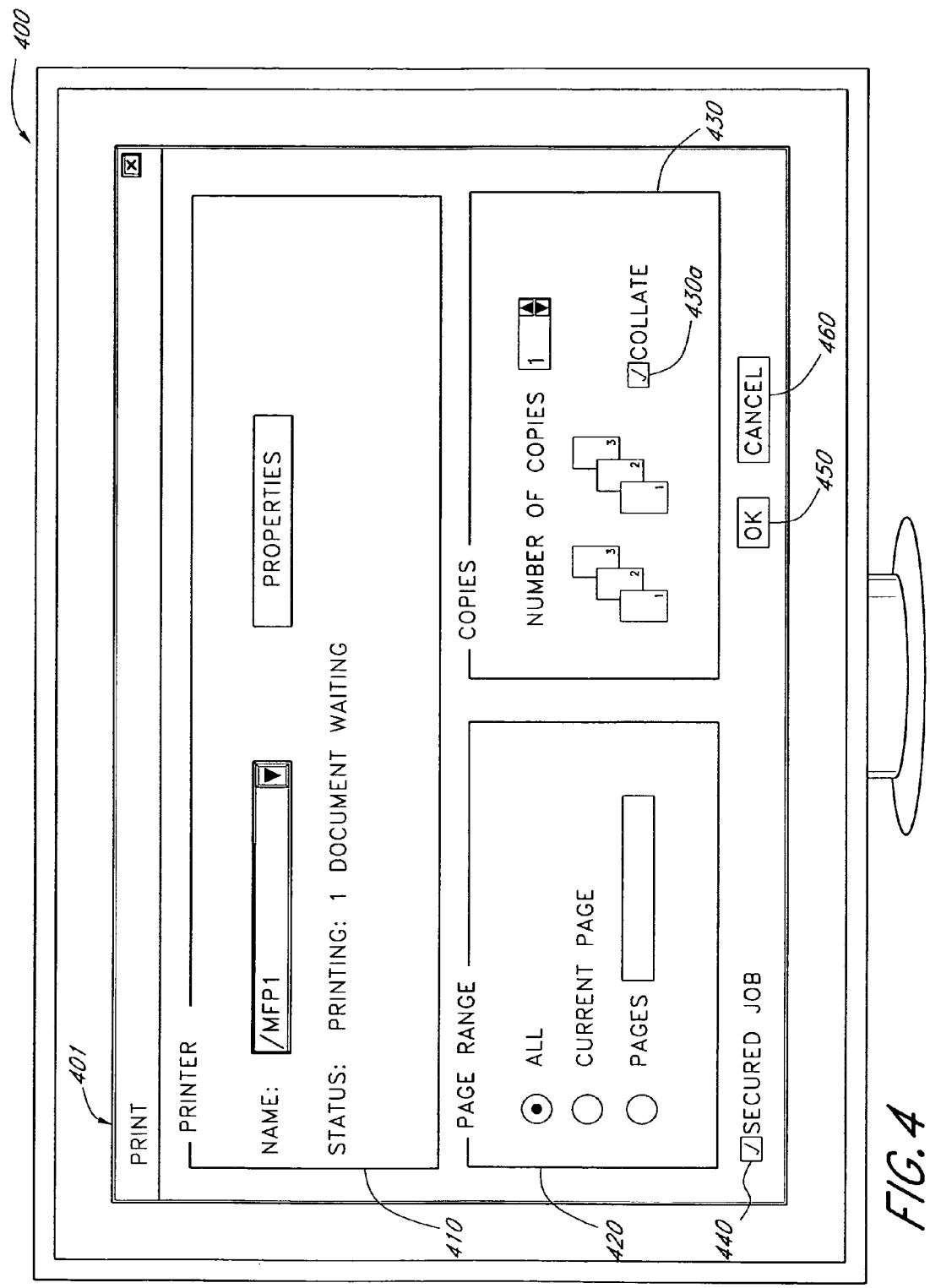
FIG. 4 illustrates yet another embodiment of a user interface of the MFP of FIG. 1.

FIG. 4 illustrates a computer monitor 400 of a computer connected to the MFP 1 of FIG. 1. Examples of the monitor 400 include, but are not limited to, a CRT monitor and an LCD monitor. The monitor 400 displays a pop-up window 401 for a print job. The window 401 includes a printer selection section 410, a page range selection section 420, and a number-of-copies section 430. The window 401 also includes a check box 440 which allows a user to select the secured job function. A user may check the box 440 when confidential material is to be processed by the MFP 1. Then, the user may click an OK button 450 to proceed with printing the material. Then, the MFP 1 prints out the material with the secured job function on (i.e., the material is stored only on the volatile memory 12 for processing, but not on the non-volatile memory 11).

Figure 5:
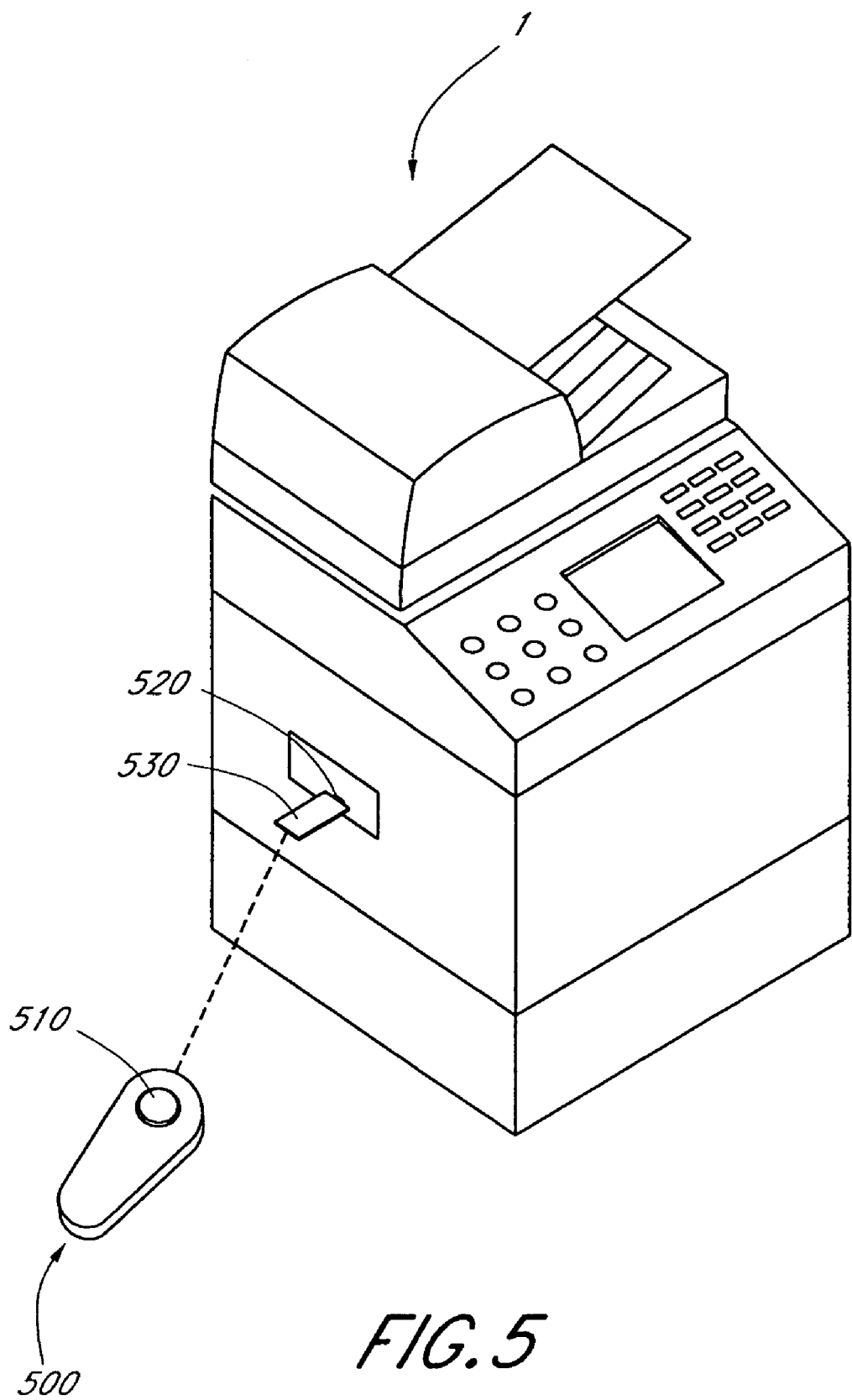
FIG. 5 illustrates another embodiment of a user interface of the MFP of FIG. 1.

FIG. 5 illustrates another embodiment of a user interface of the MFP 1 of FIG. 1. The illustrated user interface is a remote control 500. The remote control 500 is configured to wirelessly transmit a signal to the MFP 1. The MFP 1 includes a wireless receiver 530 plugged into a USB port 520 thereof. The remote control 500 may use any wireless technology or protocol suitable for establishing a wireless connection between the control 500 and the MFP 1. Examples of the wireless technology include, but are not limited to, radio frequency, infrared waves, wireless personal area network (PAN) (e.g., Bluetooth®), wireless LAN (e.g., Wi-Fi), CDMA, and satellite technologies.

The remote control 500 includes a button 510 for selecting the secured job function. A user may press the button 510 to turn on the secured job function. Then, the user may proceed with one of the functions of the MFP 1, e.g., copying, printing, faxing, scanning, or emailing. In another embodiment, the remote control 500 may include an LED indicator to indicate whether the secured job function is on or off. In such an embodiment, the remote control may also be configured to receive a signal from the MFP 1 which indicates the status of the secured job function. In yet another embodiment, the remote control 500 may be configured to make a beeping sound that indicates that a signal for the secured job function has been successfully transmitted to the MFP 1. In certain embodiments, the LED indicator 205 of FIG. 2 or the highlight 304b of FIG. 3 may be used to indicate that the secured job function is on when the button 510 has been pressed to turn the function on.

In all of the embodiments described above, the user interfaces 200, 300, 400, 500 may also be configured to turn off the secured job function. In another embodiment, the secured job function may be automatically turned off when a job has been completed. Such an automatic turn-off feature may be selected by a user or an administrator of the MFP 1. A skilled technologist will appreciate that various other configurations of user interfaces may be adapted for use with the MFP 1 for the secured job function.

In some embodiments, the secured job function may be provided with password protection. In such embodiments, when a user attempts to invoke the secured job function, a user interface (e.g., the LCD screen 201 of FIG. 2 or the computer monitor 400 of FIG. 4) displays a request for a password.

In certain embodiments, the MFP 1 is configured to allow only an administrator to turn on or off the password protection or to change the password. In one embodiment, the MFP 1 may request another password when attempting to turn on or off the password protection.

In another embodiment, the MFP 1 is provided with an embedded web server (EWS) connected to the MFP 1 over a computer network. The EWS allows an administrator to interface with one or more MFPs over a network. In such an embodiment, the MFP 1 may allow the administrator to change the password protection only via the EWS, but not via other user interfaces, for example, the user interfaces 200, 300, and 400 of FIGS. 2, 3, and 4.

Method of Operating MFP with Secured Job Function

Figure 6:
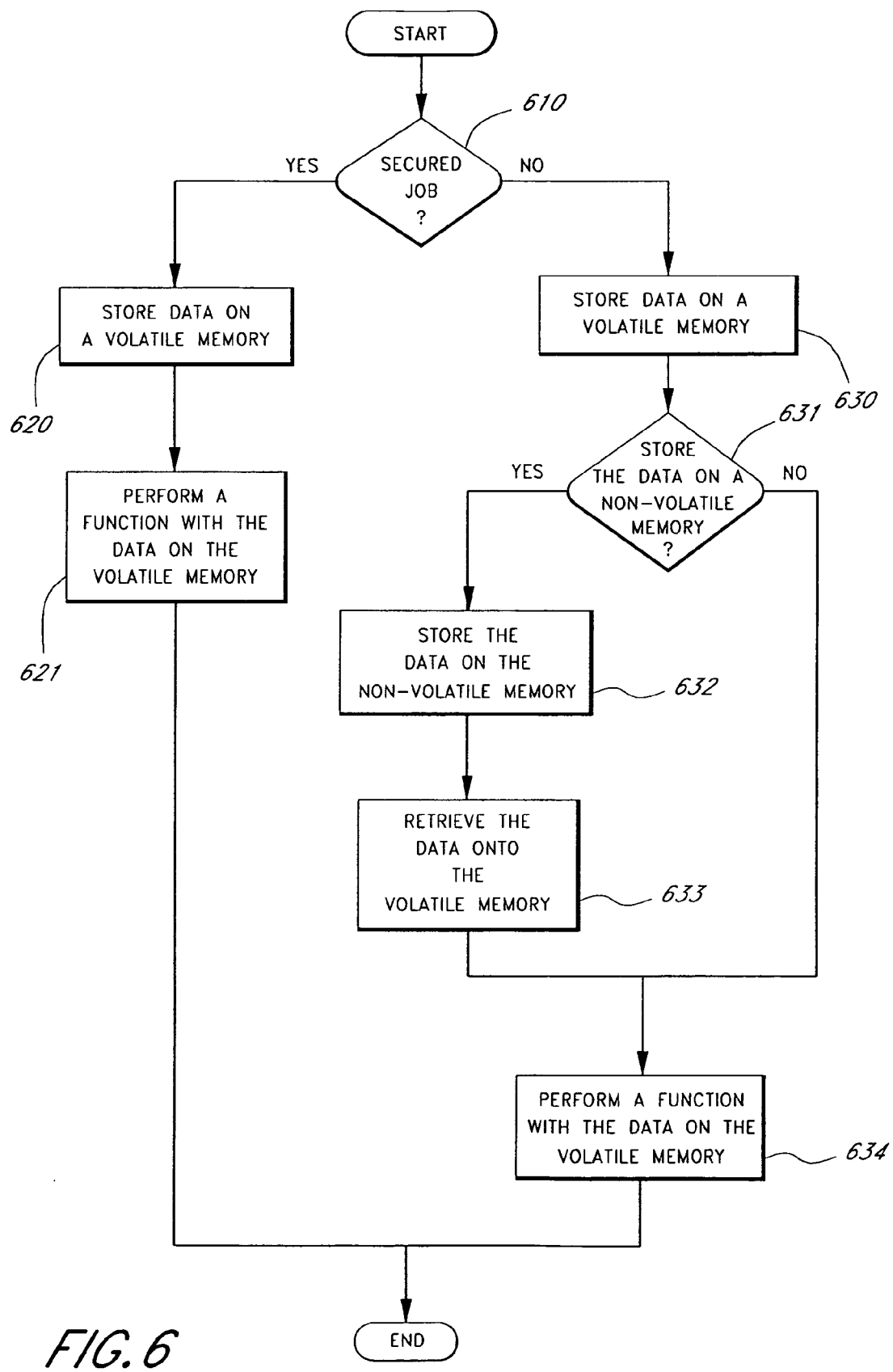
FIG. 6 is a flow chart illustrating a method of operating the MFP of FIG. 1 according to one embodiment.

In one embodiment, upon a user's selection, an MFP may prevent data from being stored on the non-volatile memory. Referring to FIGS. 1 and 6, a method of operating an MFP according to one embodiment is described below.

Referring to FIG. 6, in step 610, a user is allowed to select for the secured job function for any of functions (e.g., copying, scanning, faxing, printing, and emailing) of the MFP 1. The user may use a user interface 14 of the MFP 1 to opt for the secured job function. If the user selects the secured job function, the MFP 1 proceeds to step 620.

In step 620, the user provides the MFP 1 with physical material (e.g., a document or an image) or an electronic file to be processed by the MFP 1. For certain functions such as copying, facsimile transmitting, or scanning, the MFP 1 converts the physical material into electronic data using the scanner 18. Then, the MFP 1 stores the data or electronic file on the volatile memory 12 (e.g., a RAM). During this step, the MFP I blocks the data from being stored on the non-volatile memory 11. In certain embodiments, however, the non-volatile memory 11 is still accessible for reading data therefrom. Examples of such data include, but are not limited to, fonts and forms pre-stored on the non-volatile memory 11. In another embodiment, certain types of information may still be written on the non-volatile memory 11. Examples of such information include, but are not limited to, accounting information (e.g., the number of processed pages) and user information (e.g., email addresses and phone numbers).

Next, in step 621, the MFP 1 performs a requested function with the data stored on the volatile memory 12. In one embodiment, if the volatile memory 12 of the MFP 1 does not have a memory capacity required for storing all the data to be processed, the MFP 1 may only store a portion of the material first and process out the portion. Subsequently, the MFP 1 may store and process a next portion, and may repeat these steps until the job is completed.

Returning to step 610, if the user does not select the secured job function, the MFP 1 proceeds to step 630. First, in step 630, the MFP 1 temporarily stores data on the volatile memory 12.

Then, in step 631, the MFP 1 inquires whether the data needs to be stored on the non-volatile memory 11. In one embodiment, if the size of the data exceeds the capacity of the volatile memory, the answer is "YES." In another embodiment, if the type of a requested job requires use of the non-volatile memory 11, the answer is "YES." Examples of such a job include, but are not limited to, a collated job, a spooling job, and a stored job described above with reference to FIG. 1. If the answer is "YES," one or more portions of the data are stored on the non-volatile memory 11. Then, the one or more portions of the data are sequentially retrieved from the non-volatile memory 11 to the volatile memory 12 for processing (step 633). If the answer is "NO," the MFP 1 proceeds to step 634. In step 634, the MFP 1 performs a requested function with the data on the volatile memory 12.

In another embodiment, when an action requested by a user requires use of the non-volatile memory 11, the invocation of the secured job via the user interface 14 can be disabled (e.g., grayed-out). For example, when a user attempts to use the secured job function for certain MFP functions, the MFP can display a message indicating that the secured job function is not available. Examples of such MFP functions that require use of the non-volatile memory 11, include, but are not limited to, storage of a copy job on the non-volatile memory 11, and storage of a send or receive fax job in a local mailbox. It will be appreciated that the secured job function is not available to various other types of jobs which cannot be processed using the volatile memory 12.

The MFP according to the embodiments described above blocks data from being stored on its non-volatile memory upon a user's selection. This configuration prevents others from having access to the data because the data is only temporarily stored on the volatile memory. In addition, this configuration does not affect the performance of the MFP because the non-volatile memory is immediately available for a next job.

The foregoing description is that of embodiments of the invention and various changes, modifications, combinations and sub-combinations may be made without departing from the spirit and scope of the invention, as defined by the appended claims.

What is claimed is:

1. A multi-function peripheral (MFP) device, comprising:
a housing containing two or more of a scanner, a printer engine, and a modem for providing a MFP function of printing, scanning, facsimile receiving and transmitting, photocopying, and emailing;
a non-volatile memory;
a volatile memory for temporarily storing data, the data includes a first portion of the data, a second portion of the data, or a combination thereof;
a user interface comprising a single physical button integral with the MFP device, the single physical button being configured for storing the first portion of the data only on the volatile memory and for storing the second portion of the data on the non-volatile memory if a capacity of the volatile memory is exceeded.

2. The device of claim 1, wherein the non-volatile memory comprises a hard disk or a flash memory.

3. The device of claim 1, wherein the volatile memory comprises a random-access memory.

4. The device of claim 1, further comprising a processor configured to disable access to the non-volatile memory.

5. The device of claim 1, further comprising a switch configured to disable access to the non-volatile memory.

6. The device of claim 5, wherein the switch comprises a logical switch or a mechanical switch.

7. The device of claim 1, wherein the user interface comprises an input device configured to allow a user to disable access to the non-volatile memory.

8. The device of claim 7, wherein the input device is integral with the MFP, and wherein the input device comprises a touchscreen.

9. The device of claim 7, wherein the input device is remotely connected to the MFP, and wherein the input device comprises a computer or a remote control.

10. The device of claim 7, wherein the user interface further comprises a display device indicating whether the access to the non-volatile memory is disabled.

11. The device of claim 10, wherein the display device comprises a light-emitting diode, a display screen, and/or a computer monitor.

12. The device of claim 1, wherein the user interface is further configured to request security information when allowing a user to prevent data from being stored on the non-volatile memory.

13. The device of claim 1, wherein the MFP is configured to allow data to be retrieved from the non-volatile memory while preventing data from being stored on the non-volatile memory.

14. The device of claim 1, wherein the physical button comprises a toggle button which provides on and off states.

15. A method of operating a multi-function peripheral (MFP) device having a housing containing two or more of a scanner, a printer engine, and a modem for providing a MFP function of printing, scanning, facsimile receiving and transmitting, photocopying, and emailing; a non-volatile memory; and a volatile memory, the method comprising:
receiving an input via a single physical button integral with the MPF device, wherein the input designates storage of data only on the volatile memory, the data includes a first portion of the data and a second portion of the data;
storing the first portion of the data only on the volatile memory;

storing the second portion of the data on the non-volatile memory if a capacity of the volatile memory is exceeded;

performing the MFP function associated with the first portion of the data; and storing the second portion of the data on the volatile memory after the MFP function associated with the first portion of the data.

16. The method of claim 15, wherein the non-volatile memory comprises a hard disk or a flash memory, and wherein the volatile memory comprises a random-access memory.

17. The method of claim 15, further comprising receiving a selection for disabling a writing access to the non-volatile memory.

18. The method of claim 17, further comprising receiving security information when allowing the user to opt for disabling the writing access to the non-volatile memory.

19. The method of claim 15, further comprising displaying whether a writing access to the non-volatile memory is disabled.

20. The method of claim 15, further comprising retrieving the data from the non-volatile memory while disabling a writing access to the non-volatile memory.

21. The method of claim 15, further comprising disabling a writing access to the non-volatile memory for preventing a first portion of the data from being written on the non-volatile memory and for allowing a second portion of the data to be written on the non-volatile memory.

22. The method of claim 21, wherein performing the MFP function includes faxing, copying, scanning, printing, and emailing.

23. The method of claim 15, wherein receiving the input includes receiving the input for toggling an on state and an off state.

* * * * *